US005560636A

United States Patent [19]

Chen

[11] Patent Number: 5,560,636

[45] Date of Patent: Oct. 1, 1996

[54] FOLDABLE WHEELCHAIR

[76] Inventor: Shih-Chieh Chen, No. 3, Lane 68, Liu Yang East Street, Taichung, Taiwan

[21] Appl. No.: 542,433

[22] Filed: Oct. 12, 1995

[51] Int. Cl.[6] .......... B62B 7/08

[52] U.S. Cl. .......... 280/642; 280/650; 280/658

[58] Field of Search .......... 280/642, 641, 280/38, 639, 647, 650, 651, 657, 658

[56] References Cited

U.S. PATENT DOCUMENTS 4,606,550 8/1986 Cone .......... 280/650
4,632,421 12/1986 Shamie .......... 280/642
5,106,116 4/1992 Chen .......... 280/642
5,478,102 12/1995 Haung .......... 280/642

*Primary Examiner*—Richard M. Camby
*Attorney, Agent, or Firm*—Connolly & Hutz

[57] ABSTRACT

A wheelchair includes a pair of posts and a base having a middle portion pivotally coupled to the posts so as to allow the base to rotate from a horizontal position to an erecting position. A rod is engaged in the middle of the wheelchair for engaging with the base so as to maintain the base in the horizontal position. A lower frame has an upper portion pivotally coupled to the front end of the base for moving the front end of the base downward so as to erecting the base when the rod is disengaged from the base. The wheelchair may be folded to a compact structure for carrying purposes.

7 Claims, 4 Drawing Sheets

FOLDABLE WHEELCHAIR

BACKGROUND OF THE INVENTION

1. Field of the Invention

The present invention relates to a wheelchair, and more particularly to a foldable wheelchair.

2. Description of the Prior Art

Typical wheelchairs comprise a body having a seat portion provided in the middle portion for supporting the users and having a wheel device provided in the bottom such that the wheelchairs may be easily moved. However, the wheels may not be braked and the chair may not be rotated such that the patients may not stand up easily. In addition, the wheelchairs may not be folded to a compact configuration such that the wheelchair may not be easily carried outdoors.

The present invention has arisen to mitigate and/or obviate the afore-described disadvantages of the conventional wheelchairs.

SUMMARY OF THE INVENTION

The primary objective of the present invention is to provide a wheelchair in which the seat portion may be rotated for helping the patients to stand up and in which the wheels may be braked by brake handles.

The other objective of the present invention is to provide a wheelchair which may be folded to a compact configuration such that the wheelchair may be easily carried outdoors.

In accordance with one aspect of the invention, there is provided a wheelchair comprising a body including a lower portion having a wheel means provided thereon for moving the body, the body including a pair of posts extended upward therefrom and including a side portion having a stud which includes an orifice, the body including a middle portion having at least one ear extended therefrom, the ear including a hole formed therein, a rod slidably engaged through the orifice of the stud and including a first end located in the body and including a second end having a handle for operating the rod, a base including a middle portion pivotally coupled to the posts at a pivot shaft so as to allow the base to rotate from a horizontal position to an erecting position, the base including a stop for engaging with the first end of the rod, means for biasing the first end of the rod to engage with the stop of the base so as to maintain the base in the horizontal position, a linking means pivotally coupled between the rear end of the base and the body so as to limit the rotational movement of the base, and a lower frame including an upper portion pivotally coupled to the front end of the base and including a lower portion having a foot support secured therein. The front end of the base is depressed downward by the lower frame in order to erecting the base when the first end of the rod is disengaged from the stop of the base.

The body includes a back stay having an upper portion pivotally coupled to the body and having a lower portion, the back stay includes a middle portion having a projection means extended therefrom, the wheel means includes a pair of first wheels secured to the front and lower portion of the body and includes a pair of second wheels secured to the lower portion of the back stay, the body includes an arm means having a first end pivotally coupled to the middle portion of the body and having a second end, the second end of the arm means includes a hook means for engaging with the projection means of the back stay, the back stay is allowed to move toward the body when the hook means of the arm means is disengaged from the projection means.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
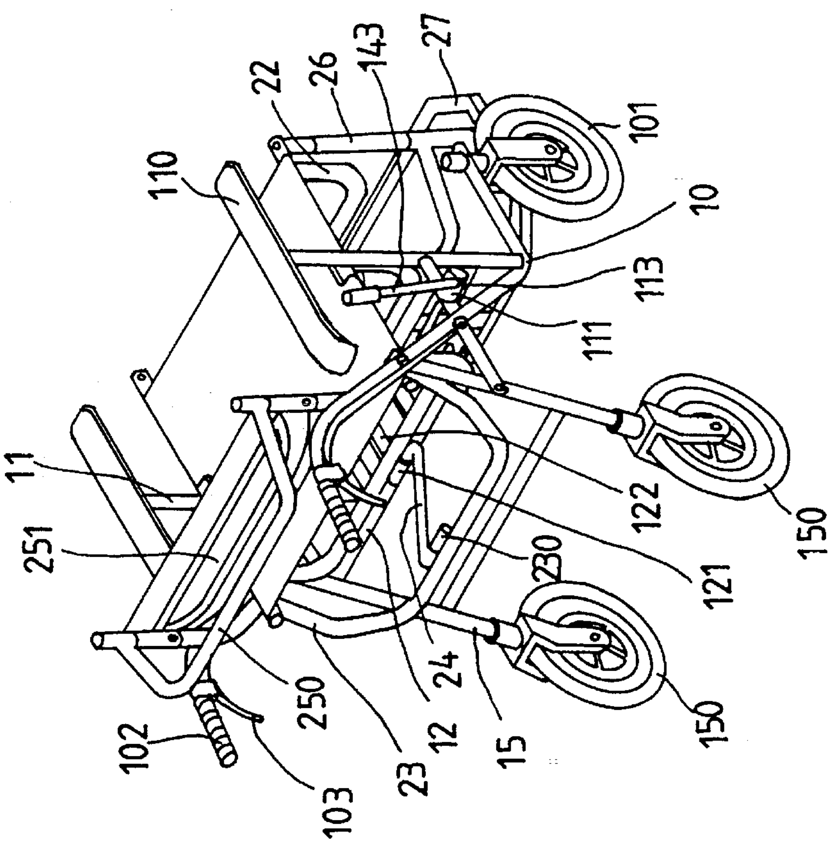
FIG. 1 is a perspective view of a wheelchair in accordance with the present invention.
Figure 3:
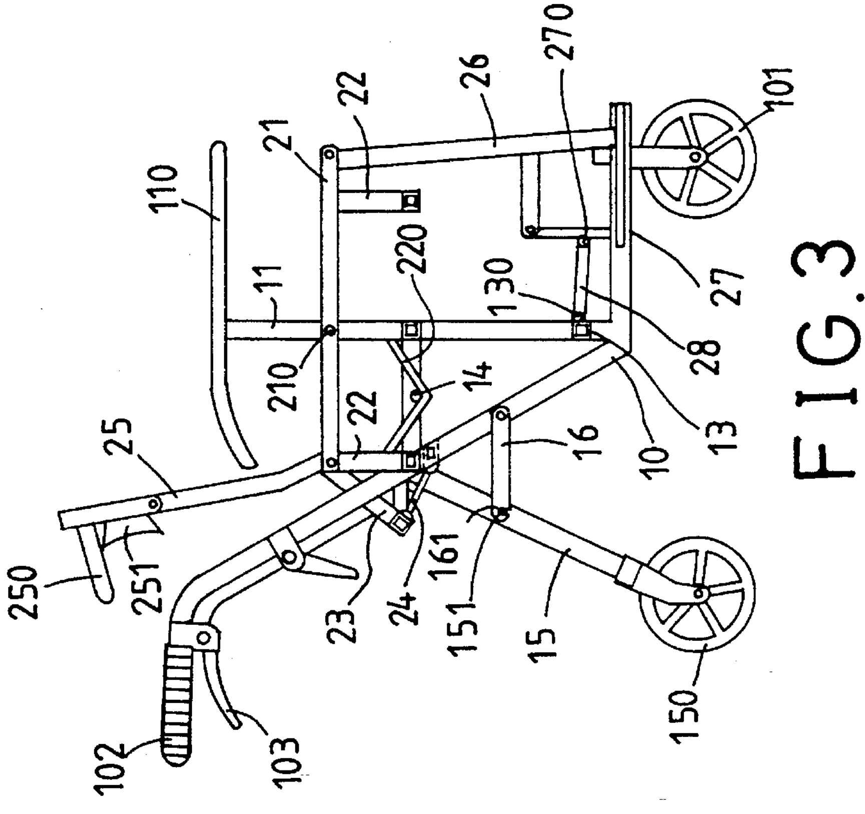
FIG. 3 is a side view of the wheelchair.
Figure 2:
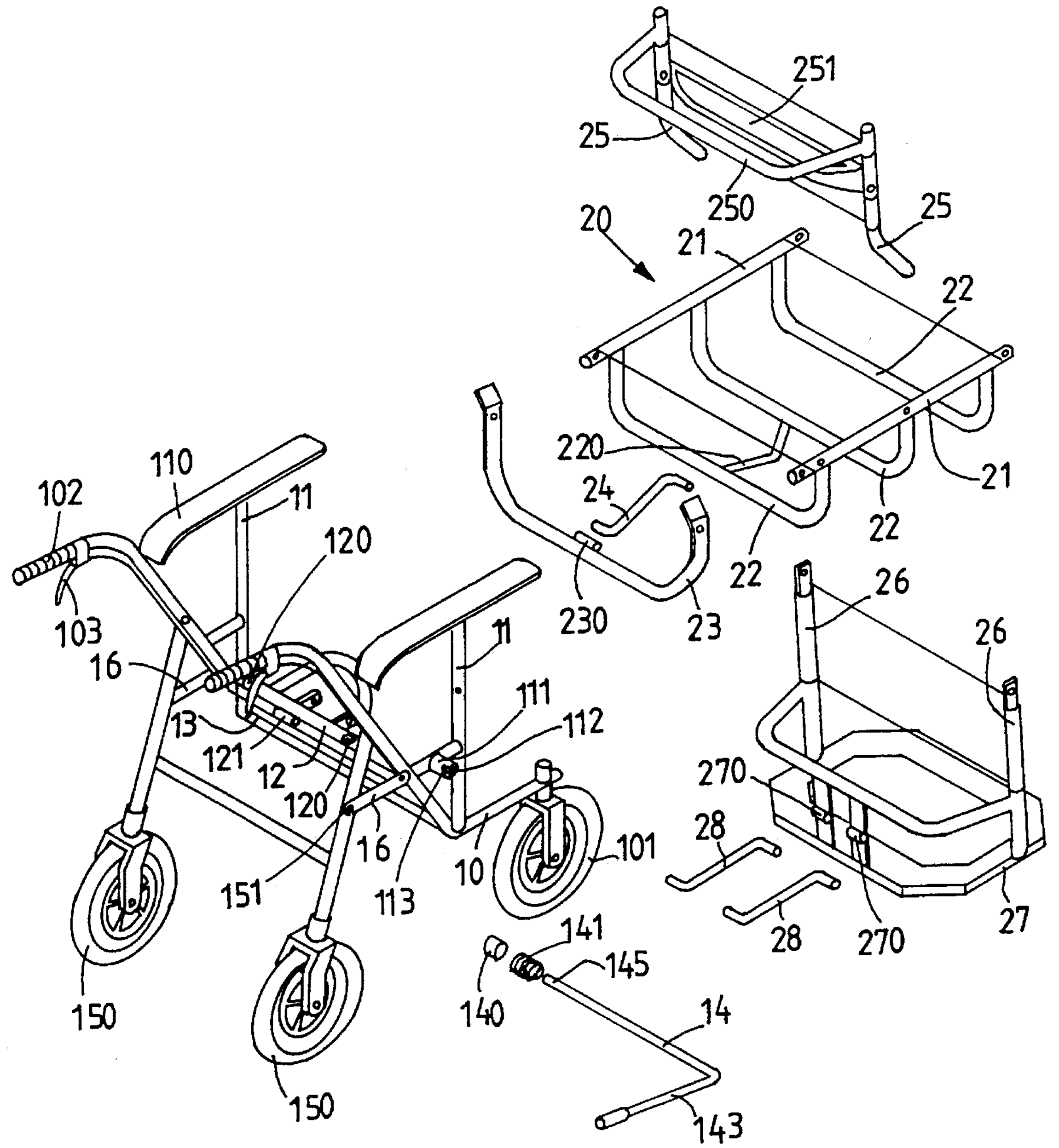
FIG. 2 is an exploded view of the wheelchair.

Referring to the drawings, and initially to FIGS. 1 to 3, a wheelchair in accordance with the present invention comprises a body 10 including a pair of wheels 101 provided in the front and lower portion thereof and including a pair hand grips 102 provided on the rear and upper portion for moving the wheelchair. The body 10 includes a pair of posts 11 extended upward therefrom and having a pair of arm rests 110 secured on top thereof. The body 10 includes a stud 111 provided on one side portion and having a orifice 112 formed therein for engaging with a rod 14 and having a notch 113 formed in the outer portion of the stud 111. The body 10 includes two beams 12, 13 provided in the middle portion thereof. The beam 12 is arranged above the other beam 13 and includes two pads 120 provided thereon and includes two ears 122 extended therefrom and includes a tube 121 secured thereto, best shown in FIGS. 2 and 4. The ears 122 each includes a hole 123 formed therein for engaging with the rod 14. The beam 13 includes two tubes 130 secured thereto (FIG. 3). A clamping ring 140 is secured on the rod 14 after the rod 14 is engaged through the holes 123 of the ears 122. The clamping ring 140 is arranged between the ears 122, best shown in FIG. 4. A spring 141 is biased between the clamping ring 140 and one of the ears 122 for moving the rod 14 inward of the body 10. The rod 14 includes an inner end 145 located in the body 10 and includes a handle 143 for operating the rod 14 and for engaging with the notch 113 of the stud 111 such that the rod 14 can be maintained in a suitable angular position.

Figure 7:
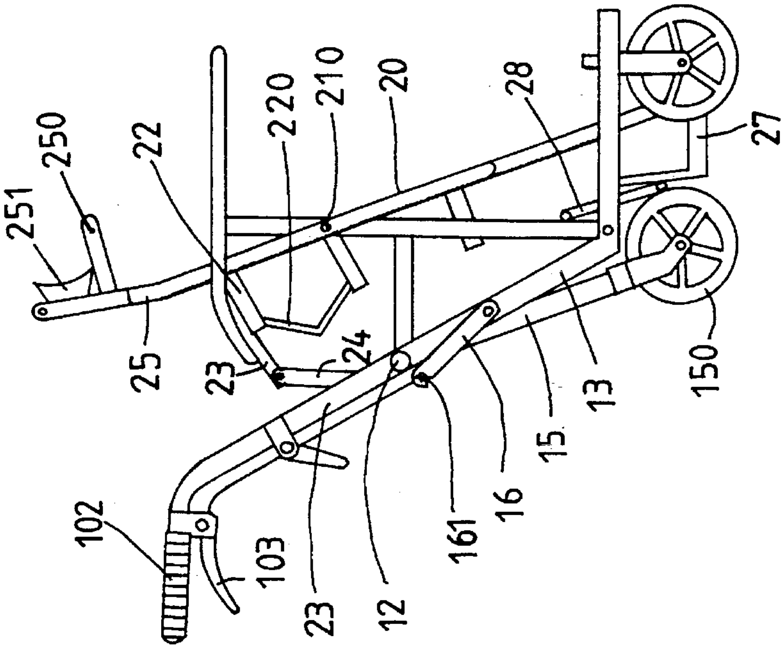
FIGS. 5, 6, 7 are plane views illustrating the operation of the wheelchair.

A back stay 15 includes an upper portion pivotally coupled to the middle portion of the body 10 such that the back stay 15 may be folded toward the body 10 so as to decrease the volume thereof, best shown in FIG. 7. The back stay 15 includes a pair of wheels 150 provided in the lower portion thereof. A pair of brake levers 103 are secured to the hand grips 102 for braking the wheels 150. The back stay 15 includes a pair of projections 151 extended outward therefrom. A pair of arms 16 have one end pivotally coupled to the middle portion of the body 10 and have a hook 161 (FIG. 7) provided on the other end for engaging with the projections 151 so as to secure the back stay 15 in an open state, as shown in FIGS. 1 to 3.

Figure 6:
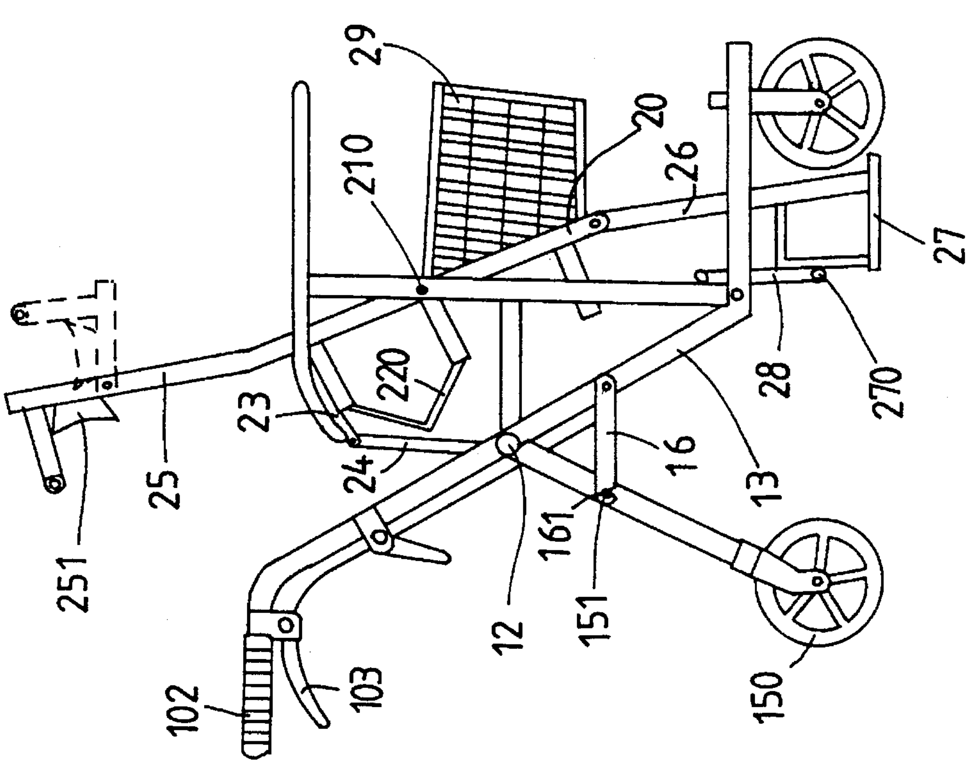
Figure 5:
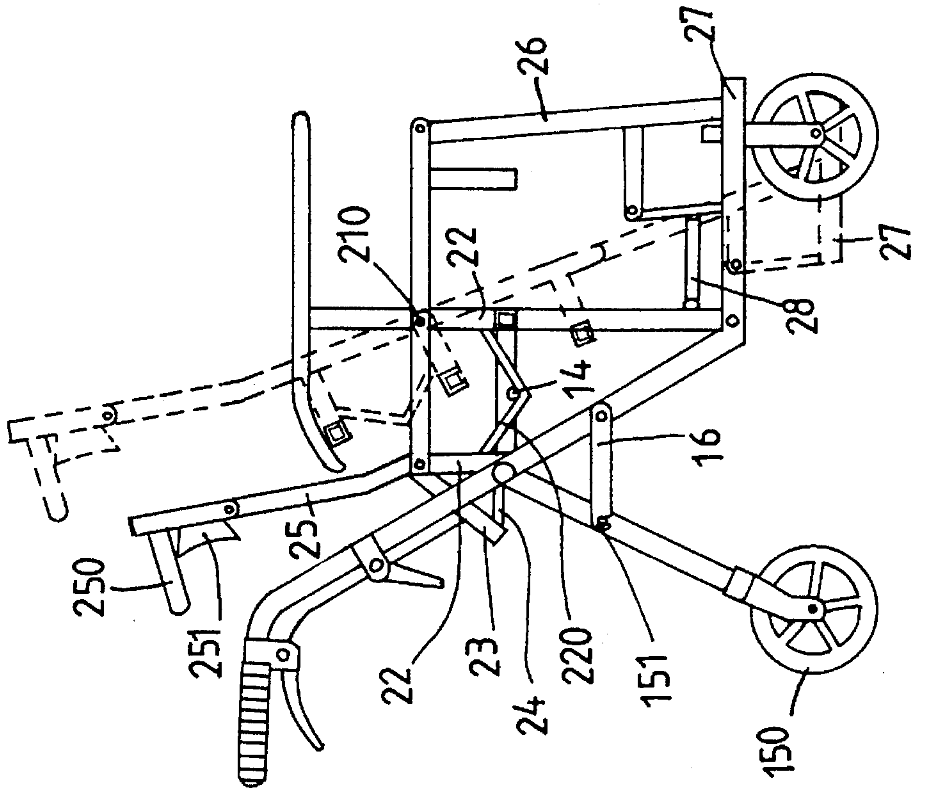

A base 20 includes a pair of bars 21 having a middle portion pivotally coupled to the posts 11 of the body 10 at a pivot shaft 210 (FIG. 3) such that the bars 21 are rotatable about the pivot shaft 210 (FIGS. 5 to 7. A seat cushion (FIG.

1) is secured on top of the base 20 for supporting a user thereon. The base 20 includes three sticks 22 secured thereto so as to form a frame for supporting the seat cushion 211 thereon. One of the sticks 22 may be engaged with the beam 12 (FIG. 1) such that the base 20 may be stably supported on a horizontal position. The base 20 includes a stop 220 secured on the rear portion thereof. A middle frame 23 has an upper portion pivotally coupled to the rear ends of the bars 21 of the base 20 and has a tube 230 secured thereon. A link 24 has two ends pivotally engaged in the tubes 230, 121 so as to pivotally couple the middle frame 23 to the beam 12 and so as to limit the rotational movement of the base 20 (FIGS. 3 and 5–7) such that the base 20 and the seat cushion 211 can be prevented from rotating freely relative to the pivot shaft 210. An upper frame 25 has a lower portion secured to the upper portion of the middle frame 23 by such as welding processes such that the upper frame 25 rotates in concert with the middle frame 23. The upper frame 25 includes a handle 250 and a bracket 251 pivotally coupled thereon such that the handle 250 and the bracket 251 may be rotated relative to the upper frame 25 so as to decrease the volume of the wheelchair (FIGS. 6 and 7).

A lower frame 26 has an upper portion pivotally coupled to the front end of the base 20 and has a foot support 27 secured in the bottom thereof. It is preferable that the foot support 27 may be rotated relative to the lower frame 26 such that the foot support 27 may be folded to a compact configuration. The lower frame 26 includes a pair of tubes 270 secured to the rear and lower portion. Two links 28 have the ends pivotally coupled to the tubes 270 and 130 so as to pivotally couple the lower frame 26 to the body 10 and so as to limit the movement of the lower frame 26. As shown in FIG. 6, a basket 29 may be attached to the base 20 so as to form a shopping cart.

Figure 4:
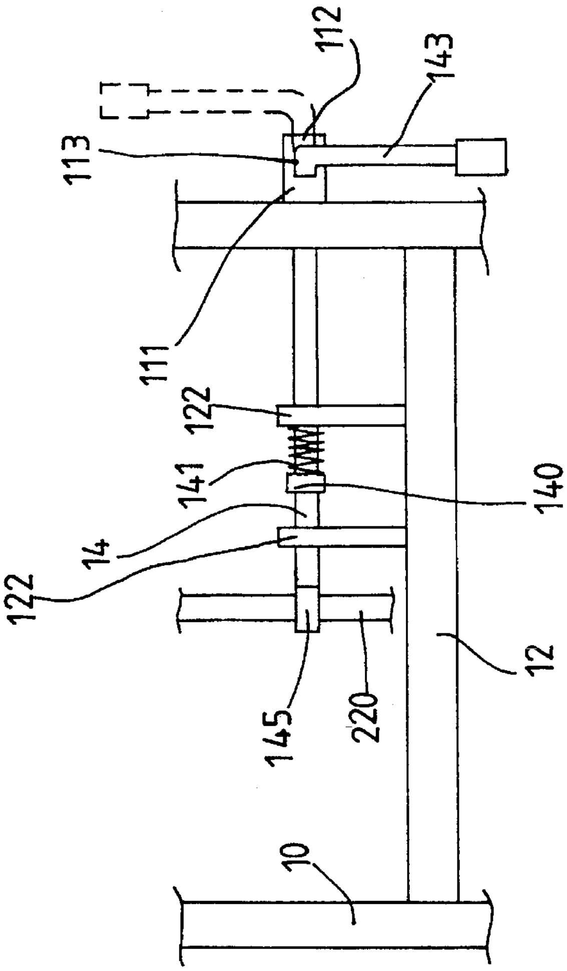
FIG. 4 is a partial schematic view illustrating the operation of the wheelchair.

In operation, as shown in FIGS. 3 to 5, the inner end 145 of the rod 14 may be biased to engage with the stop 220 by the spring 141 such that the base 20 and the seat cushion 211 may be supported in a horizontal position for supporting a patient thereon. At this moment, as shown in FIGS. 1 and 4, the handle 143 is engaged in the notch 113 of the stud 111 such that the rod 14 can be stably maintained in the position where the inner end 145 of the rod 14 is engaged with the stop 220. When the patient is going to stand up, the handle 143 is moved outward of the body 10 against the spring 141 until the inner end 145 of the rod 14 is disengaged from the stop 220 such that the base 20 may be rotated about the pivot shaft 210 (FIGS. 5–7) and such that the patient may easily stand up. The upper frame 25 is rotated in concert with the middle frame 23 to a position substantially aligned with the bars 21 of the base 20. It is to be noted that the foot support 27 may be depressed downward in order to move the front portion of the base 20 downward and in order to rotate the base 20 to a substantially vertical position.

As shown in FIG. 7, when the back stay 15 is folded to the body 10 and when the handle 250 and the bracket 251 are rotated relative to the upper frame 25, the wheelchair may be folded to a compact configuration which is excellent for storing and for transportation purposes. The wheelchair may thus be easily received in a rear trunk of the vehicle and may be easily carried outdoors. It is to be noted that the transportation fees for the configuration as shown in FIG. 7 can be decreased to one fifth of that of the configuration as shown in FIGS. 1 and 3.

Accordingly, the wheelchair in accordance with the present invention includes a seat portion that may be rotated for helping the patients to stand up. In addition, the wheelchair may be folded to a compact configuration such that the wheelchair may be easily carried outdoors.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A wheelchair comprising:

a body including a lower portion having a wheel means provided thereon for moving said body, said body including a pair of posts extended upward therefrom and including a side portion having a stud secured thereto, said stud including an orifice formed therein, said body including a middle portion having at least one ear extended therefrom, said ear including a hole formed therein, a rod slidably engaged through said orifice of said stud and including a first end located in said body and including a second end having a handle secured thereto for operating said rod, a base including a middle portion pivotally coupled to said posts at a pivot shaft so as to allow said base to rotate from a horizontal position to an erecting position, said base including a front end and a rear end, said base including a stop secured therein for engaging with said first end of said rod, means for biasing said first end of said rod to engage with said stop of said base so as to maintain said base in said horizontal position, a linking means pivotally coupled between said rear end of said base and said body so as to limit the rotational movement of said base, and a lower frame including an upper portion pivotally coupled to said front end of said base and including a lower portion having a foot support secured therein, said front end of said base being depressed downward by said lower frame in order to erecting said base when said first end of said rod is disengaged from said stop of said base.

2. A wheelchair according to claim 1, wherein said body includes a front and lower portion and a back stay having an upper portion pivotally coupled to said middle portion of said body and having a lower portion, said back stay includes a middle portion having a projection means extended therefrom, said wheel means includes a pair of first wheels secured to said front and lower portion of said body and includes a pair of second wheels secured to said lower portion of said back stay, said body includes an arm means having a first end pivotally coupled to said middle portion of said body and having a second end, said second end of said arm means includes a hook means for engaging with said projection means of said back stay, said back stay is allowed to move toward said body when said hook means of said arm means is disengaged from said projection means.

3. A wheelchair according to claim 1, wherein said stud includes a notch formed therein for engaging with said handle so as to retain said rod in place.

4. A wheelchair according to claim 1, wherein said rod includes a clamping ring secured thereon, said biasing means includes a spring biased between said ear and said clamping ring for biasing said first end of said rod to engage with said stop.

5. A wheelchair according to claim 1, wherein said linking means includes a middle frame having an upper portion pivotally coupled to said rear end of said base and includes a link pivotally coupled between said middle frame and said middle portion of said body so as to limit the rotational movement of said base.

6. A wheelchair according to claim 5 further comprising an upper frame having a lower portion secured to said upper portion of said middle frame such that said upper frame and said middle frame rotate in concert with each other.

7. A wheelchair according to claim 1, wherein said lower frame includes a rear and lower portion and includes at least one link pivotally coupling said rear and lower portion of said lower frame to said middle portion of said body so as to limit a movement of said lower frame.

* * * * *